(12) United States Patent
Nakamura et al.

(10) Patent No.: US 7,879,473 B2
(45) Date of Patent: Feb. 1, 2011

(54) FUEL CELL UNIT, CONTROL METHOD THEREOF, INFORMATION PROCESSING APPARATUS, AND POWER SUPPLY CONTROL METHOD THEREOF

(75) Inventors: Koji Nakamura, Akiruno (JP); Akihiro Ozeki, Ome (JP); Ryoji Ninomiya, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1194 days.

(21) Appl. No.: 11/509,044

(22) Filed: Aug. 24, 2006

(65) Prior Publication Data

US 2007/0042245 A1     Feb. 22, 2007

(51) Int. Cl.
*H01M 8/02* (2006.01)
(52) U.S. Cl. .................... 429/23; 429/428; 429/400
(58) Field of Classification Search .................. None
See application file for complete search history.

(56) References Cited

U.S. PATENT DOCUMENTS

| | | | |
|---|---|---|---|
| 7,393,604 B2 * | 7/2008 | Rocke et al. | 429/430 |
| 2004/0062960 A1 * | 4/2004 | Sakaue et al. | 429/19 |
| 2004/0175598 A1 * | 9/2004 | Bliven et al. | 429/12 |
| 2004/0219415 A1 * | 11/2004 | Brignone et al. | 429/34 |
| 2005/0014041 A1 * | 1/2005 | Becerra et al. | 429/22 |

FOREIGN PATENT DOCUMENTS

| | | |
|---|---|---|
| JP | 2001-163063 | 6/2001 |
| JP | 2002-50378 | 2/2002 |
| JP | 2002-169629 | 6/2002 |
| JP | 2003-45468 | 2/2003 |
| JP | 2003-142137 | 5/2003 |
| JP | 2003-288136 | 10/2003 |
| WO | WO 03/012902 | * 2/2003 |

OTHER PUBLICATIONS

International Preliminary Report on Patentability, Written Opinion, and International Search Report issued by the International Bureau of WIPO for International Patent Application No. PCT/JP2005/003697.

* cited by examiner

*Primary Examiner*—Ula C Ruddock
*Assistant Examiner*—Alix Echelmeyer
(74) *Attorney, Agent, or Firm*—Finnegan, Henderson, Farabow, Garrett & Dunner, L.L.P.

(57) ABSTRACT

A fuel cell unit according to the present invention is connectable to an external apparatus and includes a fuel cell generating an electric power, an auxiliary device feeding a fuel and air to the fuel cell, and a controller controlling power generation performed using the fuel cell. After receiving an electric power supplied from the external apparatus, the controller supplies an electric power supplied from the external apparatus to the auxiliary device.

5 Claims, 6 Drawing Sheets

FUEL CELL UNIT, CONTROL METHOD THEREOF, INFORMATION PROCESSING APPARATUS, AND POWER SUPPLY CONTROL METHOD THEREOF

CROSS-REFERENCE TO RELATED APPLICATION

This application is based upon and claims the benefit of priority from PCT application No. PCT/JP2005/003697 filed Feb. 25, 2005 and Japanese Patent Application No. 2004-54878, filed Feb. 27, 2004, the entire contents of which are incorporated herein by reference.

BACKGROUND

1. Field

The present invention relates to a fuel cell unit, a control method thereof, an information processing apparatus, and a power supply control method thereof, and more particularly relates to a fuel cell unit to be connected to an information processing apparatus via a connector, a control method of the fuel cell unit, an information processing apparatus, and a power supply control method thereof.

2. Description of the Related Art

As a secondary battery used as one of electric power supply sources for information processing apparatuses, for example, a lithium ion battery has been currently used. Compared to a disposal type primary battery, as one of features of the secondary battery, it can be repeatedly used when being charged, for example, using a commercial power source.

However, since being a secondary battery, the lithium ion battery must be charged, for example, using a commercial power source.

In addition, improvement in performance of information processing apparatuses has been significant in recent years, and concomitant with this improvement, electric power consumption of the information processing apparatuses tend to be increased. Accordingly, the increase in energy density, that is, an output energy amount per unit volume or per unit mass, of the lithium ion battery which supplies an electric power to information processing apparatuses has been desired; however, it has been difficult to expect remarkable improvement under current circumstances.

On the other hand, it has been said that the energy density of a fuel cell is theoretically 10 times that of the lithium ion battery (for example, see "Fuel Cell 2004 (Nenryou-Denchi 2004)" Nikkei Business Publications, Inc., pp. 49-50 and pp. 64, October 2003, hereinafter referred to as Non Patent Document 1). This means that, when having the same volume or the same mass as that of the lithium ion battery, the fuel cell has a potential ability to supply an electric power for a longer time (such as 10 times). In addition, it also means that when the time of the fuel cell to supply an electric power is equal to that of the lithium ion battery, the fuel cell has a high potential ability to reduce its own size and weight as compared to that of the lithium ion battery.

In addition, when fuel such as methanol is sealed inside a small container which is to be used as a replacement unit, and the small container itself is replaced with new container for the fuel supply, charging performed using an external tool is not required. Hence, for example, when an electric power is ensured by the fuel cell at a place at which AC power supply facilities are not present, an information processing apparatus can be used for a long period of time as compared to the case in which an electric power is ensured by the lithium ion battery.

Furthermore, when an information processing apparatus (such as a notebook type personal computer) using the lithium ion battery is used for a long period of time, it is difficult to perform long-term operation by using an electric power supplied from the lithium ion battery, and hence the use of the information processing apparatus is limited to a circumstance in which the supply of electric power is available from an AC power source. However, compared to the case in which the information processing apparatus is operated using the lithium ion battery, the information processing apparatus can be operated for a long time by using an electric power supplied from the fuel cell, and in addition, it can be expected that the limitation described above is resolved.

From the points described above, for the purpose of supplying an electric power to information processing apparatuses, research and development of the fuel cell has been carried out and has also been disclosed, for example, in Japanese Patent Application Publication (KOKAI) No. 2003-142137 and Japanese Patent Application Publication (KOKAI) No. 2002-169629.

Although various fuel cell systems (for example, see "Everything of Fuel Cell (Nenryoudenchi-no-subete)," Hironosuke Ikeda, Nippon Jitsugyo Publishing Co., Ltd., August 2001, hereinafter referred to as Non Patent Document 2) have been proposed, in consideration of compactness, light weight, and easy handling properties of fuel, for example, a direct methanol fuel cell (DMFC) system may be mentioned. This fuel cell system uses methanol as a fuel, and methanol is directly fed to a fuel electrode without being converted into hydrogen.

In the direct methanol fuel cell, the concentration of methanol to be fed to the fuel electrode is important, and when this concentration is high, the power generation efficiency is degraded, and as a result, sufficient performance cannot be obtained. This degradation is caused by a phenomenon (called a cross-over phenomenon) in which part of methanol used as a fuel passes through an electrolyte membrane (solid high molecular weight electrolyte membrane) placed between a fuel electrode (negative electrode) and an air electrode (positive electrode). The cross-over phenomenon becomes apparent when the concentration of methanol is high, and when low concentration methanol is fed to the fuel electrode, the above phenomenon can be suppressed.

On the other hand, when low concentration methanol is used, although high performance is easily ensured, since the fuel volume is increased (such as 10 times) as compared to that of high concentration methanol, the size of a fuel container (fuel cartridge) becomes large.

Accordingly, while high concentration methanol is received in the fuel cartridge to reduce the size thereof, before being fed to the fuel electrode, when methanol is diluted with water which is generated during power generation and is circulated using small pumps, valves and the like to decrease the high concentration methanol, the cross-over phenomenon can be suppressed. By the method described above, the power generation efficiency can be improved. Hereinafter, the pumps, the valves and the like which are used for circulating generated water are collectively called an auxiliary device, and the circulation system as described above is called a dilution circulation system.

As described above, while the size and the weight of the entire fuel cell unit are being reduced, a fuel cell unit having a high power generation efficiency can be realized using diluted methanol (Non-Patent Document 1).

By employing the dilution circulation system in a direct methanol fuel cell, the size and weight of the entire fuel cell unit can be reduced, and in addition, the power generation efficiency can be increased, so that a high-output fuel cell unit can be realized.

However, in the dilution circulation system, the auxiliary device including pumps and valves is necessary for circulating water and the like, and hence a power source for driving the auxiliary device is required. When the fuel cell itself once starts the power generation, the auxiliary device can be driven by an electric power generated thereby; however, at least before the fuel cell itself starts the power generation, a power source for driving the auxiliary device is necessary. Hence, a system may be considered in which a power source (such as a small lithium ion battery) for generating a small electric power is additionally embedded in the fuel cell unit so as to drive the auxiliary device at the start of operation.

Incidentally, in many information processing apparatuses (such as a notebook personal computer), a secondary battery (such as a lithium ion battery) is embedded in order to enable the apparatus to be operated for a predetermined time. Hence, when the auxiliary device is driven by an electric power supplied from the secondary battery embedded in the information processing apparatus at the start of the fuel cell unit, the power supply for the auxiliary device is not necessary for the fuel cell unit side, and as a result, the size and the weight thereof can be further reduced.

When the drive of the auxiliary device is once started, and diluted methanol used as a fuel and air are started to be supplied to the fuel electrode and the air electrode, respectively, the fuel cell unit starts its own power generation. After the fuel cell starts the power generation, when the electric power generated by the fuel cell is supplied to the information processing apparatus, the information processing apparatus is driven, and in addition, part of the electric power can drive the auxiliary device.

In addition, when the electric power is excessively generated, the secondary battery embedded in the information processing apparatus can be charged. When the external fuel cell unit and the secondary battery inside the information processing apparatus are complementarily driven as described above, an optimum power supply system can be provided in which the size and the weight of the system can be reduced as a whole. By the way, this system may be called a hybrid system in some cases.

As described above, a system (that is, the hybrid system) has various advantages in which (1) a fuel cell unit employing the dilution circulation system is connected to an information processing apparatus and (2) without providing a power source inside the fuel cell unit for driving an auxiliary device, an electric power (for driving the auxiliary device or the like) necessary when a fuel cell starts is supplied from a secondary battery embedded in the information processing apparatus.

However, on the other hand, the following problems to be solved may be mentioned. That is, (1) when a mismatched fuel cell unit or another inadequate unit is connected to the information processing apparatus in order to supply an electric power to the auxiliary device from the secondary battery embedded in the information processing apparatus, the safely of the unit connected to the information processing apparatus as described above cannot be ensured, and in addition, the safety of the information processing apparatus itself may also be impaired in some cases. Hence, in particular, it should be construed that a first problem to be solved is to sufficiently ensure the safety at the start of the operation of the fuel cell unit.

In addition, it is necessary that (2) the auxiliary device be appropriately controlled in accordance with the condition of the fuel cell unit and that of the information processing apparatus. Hence, it should be construed that a second problem to be solved is that the fuel cell unit receives various instructions (commands) from the information processing apparatus when the operation is started, being operated, and stopped.

Accordingly, it is desired that (3) the objects described in the above (1) and (2) can be simply realized at a low cost.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

A first embodiment of a fuel cell unit according to the present invention will be described with reference to figures.

Figure 1:
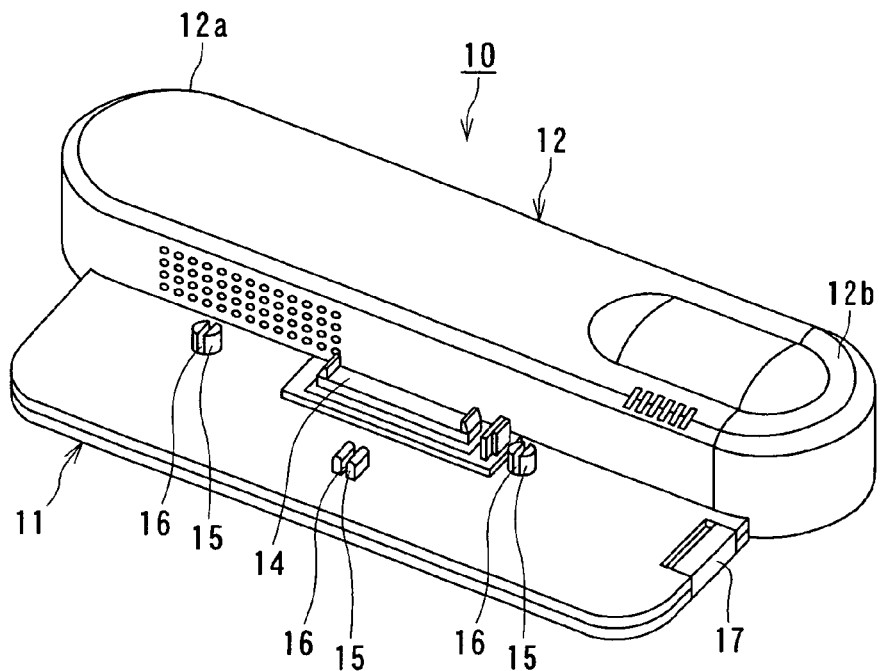
FIG. 1 is a view showing the appearance of an embodiment of a fuel cell unit according to the present invention.

FIG. 1 is a view showing the appearance of a fuel cell unit according to the present invention. This fuel cell unit 10 is formed of a fuel cell unit body 12 and a receiving portion 11 for receiving a back portion of an information processing apparatus 18 such as a notebook personal computer. In the fuel cell unit body 12, a DMFC stack performing power generation in accordance with an electrochemical reaction and an auxiliary device (including pumps and valves) are embedded, the auxiliary device feeding methanol used as fuel and air to the DMFC stack and performing circulation of the above fuel and the like. In addition, in a unit case 12a of the fuel cell unit body 12, a detachable fuel cartridge (not shown in the figure) is embedded, for example, at the right end side. A cover 12b is detachable so as to exchange this fuel cartridge.

Figure 2:
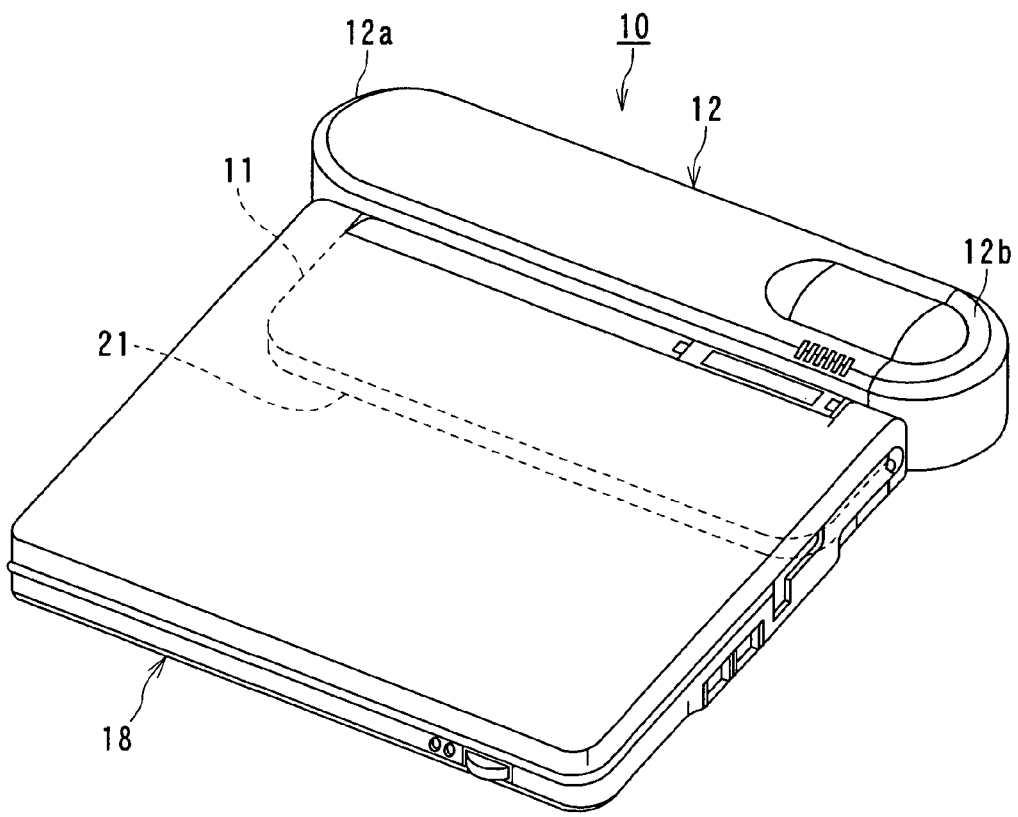
FIG. 2 is a view showing the appearance of the fuel cell unit and an information processing apparatus connected thereto.

On the receiving portion 11, the information processing apparatus 18 is placed. FIG. 2 is a view showing the appearance of a notebook personal computer, one example of the information processing apparatus 18, which is placed on and connected to the fuel cell unit 10.

Figure 3:
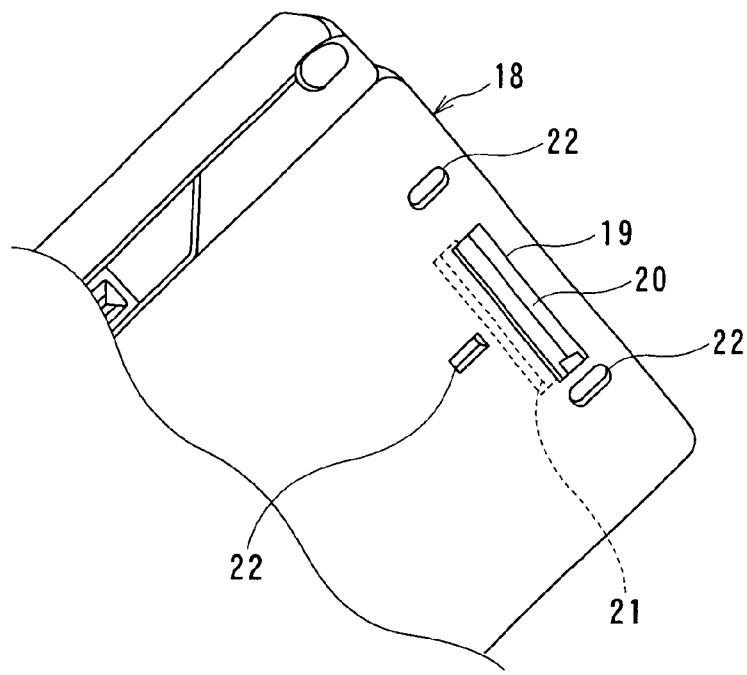
FIG. 3 is a view showing the appearance of a back portion of the bottom surface of an information processing apparatus to be connected to the fuel cell unit.

The information processing apparatus 18 is electrically and mechanically connected to the fuel cell unit 10 as shown in FIGS. 1 and 3. On the upper surface of the receiving portion 11 shown in FIG. 1, a single connector is provided as a connection portion to be electrically and mechanically connected to the information processing apparatus 18. Hereinafter, this connector is called a docking connector 14.

Incidentally, a device, which is connectable to the information processing apparatus 18 in order to expand the functionality thereof, may be called a docking station or a docker in some cases. As the docker, for example, there may be mentioned a device incorporating a hard disc to expand the functionality and a device having the same connector as an external connector of the information processing apparatus 18 so as to be easily connected to an external peripheral apparatus such as a printer (this type of docker may be further called a port replicator in some cases). The fuel cell unit 10 is similar to the docker as described above from a mechanical point of view and hence may be called a docker type fuel cell unit in some cases.

Positioning protrusions 15 and hooks 16 are disposed at respective three places around the docking connector 14 provided on the receiving portion 11 of the fuel cell unit 10 shown in FIG. 1. In addition, FIG. 3 is a view showing the appearance of a back portion of the bottom surface of the information processing apparatus 18, and at a position of the bottom surface of the information processing apparatus 18 corresponding to the docking connector 14 of the fuel cell unit 10, an opening 19 is provided. At the back of the opening 19, a docking connector 21 is provided as a connection portion of the information processing apparatus 18, and when the information processing apparatus 18 is placed on the receiving portion 11 of the fuel cell unit 10, the docking connectors 14 and 21 thereof are engaged with each other. In addition, in the opening 19 of the information processing apparatus 18, a shutter 20 is provided for dust proofing, and this shutter 20 is opened when the information processing apparatus 18 is placed.

Furthermore, in the bottom surface of a case of the information processing apparatus 18, holes 22 are provided at three places around the opening 19, and the positioning protrusions 15 and the hooks 16 are inserted into the respective holes 22. The hooks 16 are each provided for fixing the fuel cell unit 10 and the information processing apparatus 18 after it is placed on the fuel cell unit 10, and when the information processing apparatus 18 is placed on the fuel cell unit 10, both of them are locked with each other by an internal locking mechanism (not shown) provided inside the receiving portion 11, so that the information processing apparatus 18 is fixed to the fuel cell unit 10.

When the information processing apparatus 18 is to be disengaged from the fuel cell unit 10, by pushing an injection button 17 shown in FIG. 1, the lock is released, and hence the information processing apparatus 18 can be easily disengaged.

In addition, the shape and the size of the fuel cell unit 10 or the shape or the location of the docking connector shown in FIGS. 1 to 3 may be variously formed.

Next, the operation principle of a fuel cell will be described.

Since previously described in detail in published literatures (such as Non-Patent Document 1), the operational principle will be briefly described.

Figure 4:
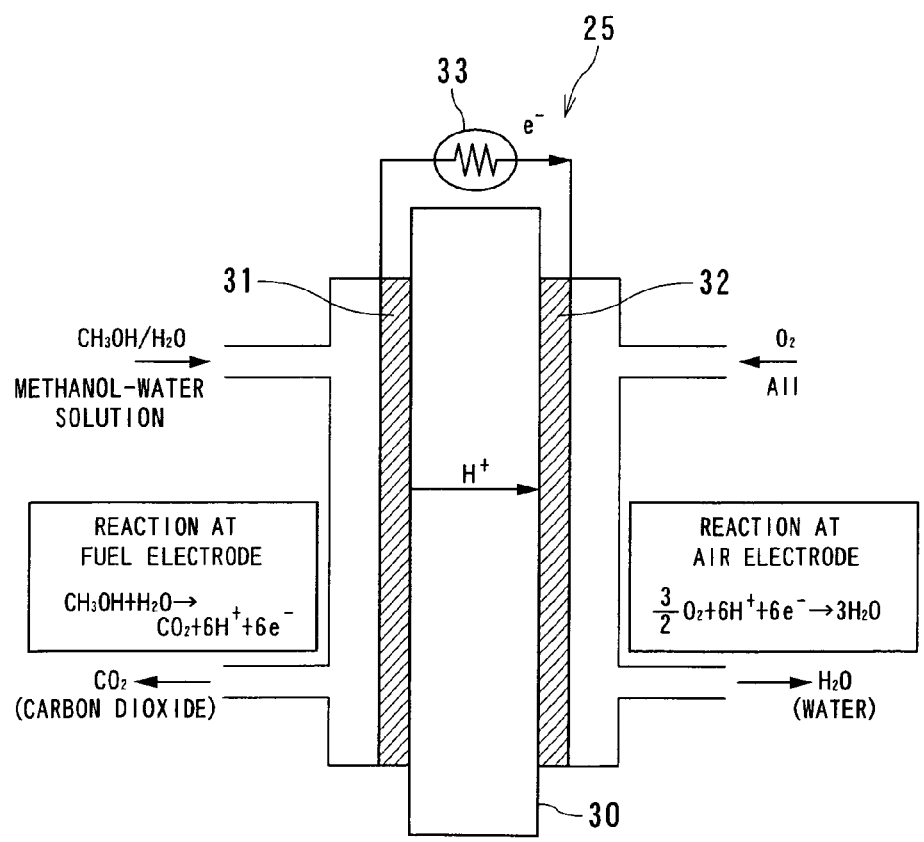
FIG. 4 is a schematic view for illustrating an operational principle of a fuel cell (DMFC).

FIG. 4 is a schematic view for illustrating the operational principle of a direct methanol fuel cell (DMFC cell) 25 which is a fuel cell system forming the fuel cell unit 10. In the DMFC cell 25, an electrolyte membrane 30 is provided at a central position, and a fuel electrode (negative electrode) 31 and an air electrode (positive electrode) 32 are provided at two sides of the electrolyte membrane 30.

In the DMFC cell 25, when an methanol-water solution is fed to the fuel electrode 31, an oxidation reaction of methanol occurs at the fuel electrode 31, and as a result, electrons ($e^-$), hydrogen ions ($H^+$) and carbon dioxide ($CO_2$) are generated. Of those products mentioned above, the hydrogen ions ($H^+$) pass through the electrolyte membrane 30 and reach the air electrode 32. In addition, the carbon dioxide ($CO_2$) is discharged from the other end of the fuel electrode 31.

In addition, the electrons ($e^-$) flow from the fuel electrode 31 to the air electrode 32 via a load 33. By this flow of the electrons, an electric power is supplied outside. At the air electrode 32, oxygen ($O_2$) in air which supplied from the outside is reduced by the hydrogen ions ($H_2$) passing through the electrolyte membrane 30 and the electrons ($e^-$) flowing via the load, and as a result, water (water vapor) is generated.

FIG. 4 is a view showing one unit forming a direct methanol fuel cell (DMFC), and the unit is called the DMFC cell 25. In practice, the DMFC cells 25 described above are stacked with each other so as to obtain predetermined voltage and current. The DMFC cell units 25 which are stacked with each other are called a DMFC stack.

Figure 5:
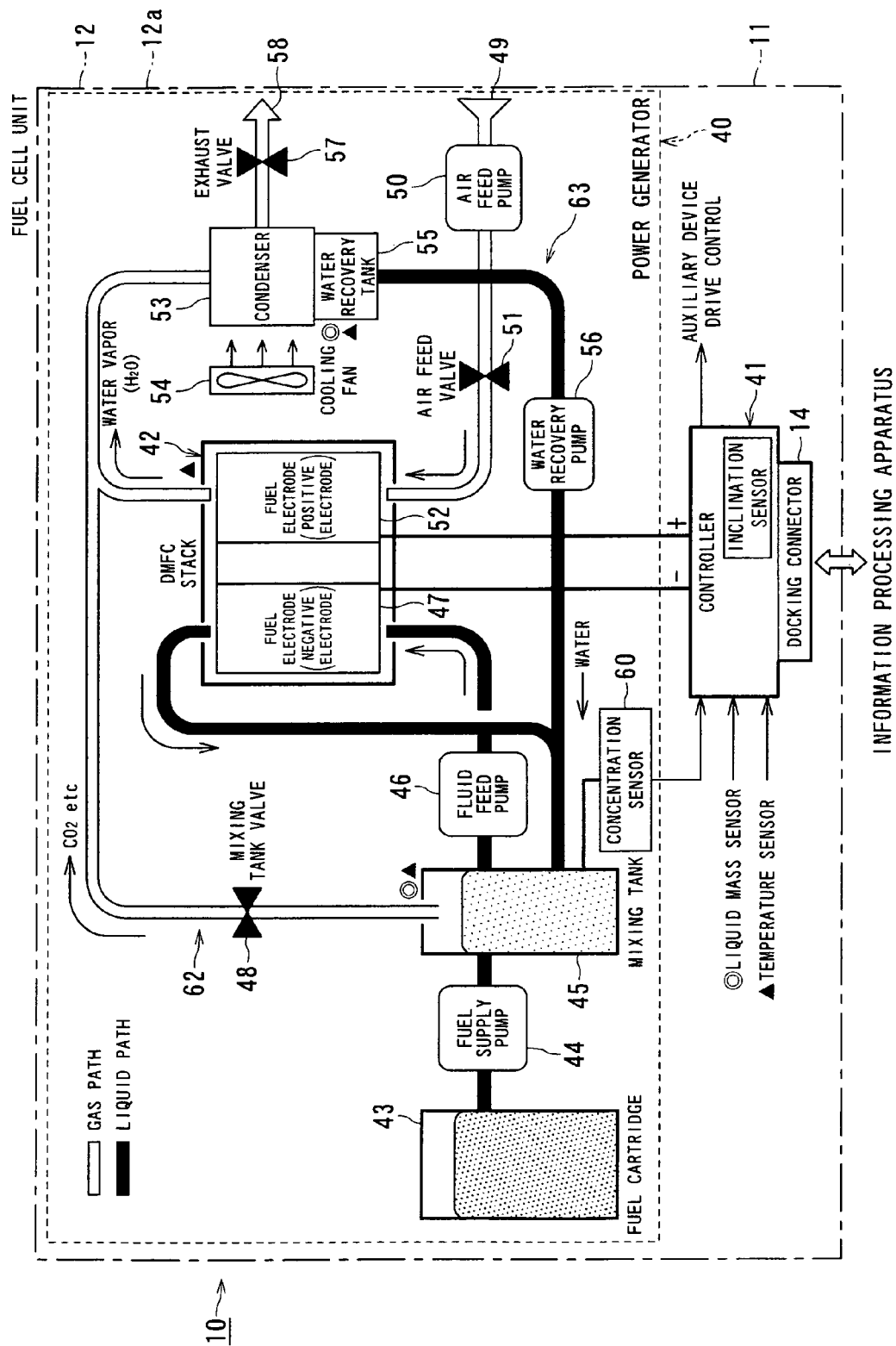
FIG. 5 is a schematic diagram primarily showing a power generator of the fuel cell unit.

FIG. 5 is a schematic diagram of the fuel cell unit 10 according to the present invention and particularly shows a power generator 40 of the fuel cell unit 10 in detail.

The fuel cell unit 10 is formed of the power generator 40 and a controller 41. The controller 41 has a communication function with the information processing apparatus 18 besides the control of the power generator 40.

The power generator 40 has a fuel cartridge 43 containing methanol used as a fuel besides a DMFC stack 42 which is primarily responsible for power generation. In the fuel cartridge 43, high concentration methanol is sealed. The fuel cartridge 43 is detachable so as to be easily replaced with a new one when the fuel therein runs out.

In addition, in order to increase the power generation efficiency of the direct methanol fuel cell, it is necessary to suppress the cross-over phenomenon. For this purpose, it is effective that high concentration methanol is diluted to low concentration methanol and is then fed to a fuel electrode 47. In order to realize this situation, in the fuel cell unit 10, a dilution circulation system 62 is employed and is provided for the power generator 40. The dilution circulation system 62 is realized by an auxiliary device 63 including a plurality of constituent elements.

As shown in FIG. 5, the auxiliary device 63 includes a fuel supply pump 44, a mixing tank 45, a fluid feed pump 46, a mixing tank valve 48, a air feed pump 50, a air feed valve 51, a condenser 53, a cooling fan 54, a water recovery tank 55, a water recovery pump 56, and an exhaust valve 57, which are plumbed to each other and which are provided in a liquid path for circulating an methanol-water solution, water, and the like and in a gas path for circulating air and the like.

Next, a power generation mechanism of the power generator 40 of the fuel cell unit 10 will be described along the flow of the fuel and air (oxygen).

First of all, high concentration methanol in the fuel cartridge 43 is supplied into the mixing tank 45 by the fuel supply pump 44. In the mixing tank 45, the high concentration methanol is diluted, for example, with recovered water and low concentration methanol (residual produced by a power generation reaction) from the fuel electrode 47, so that low concentration methanol is produced. The concentration of the low concentration methanol is controlled so as to maintain a concentration (such as 3 to 6 mass percent) which can achieve a high power generation efficiency. For example, the control is carried out by controlling the amount of high concentration methanol supplied to the mixing tank 45 by the fuel supply pump 44 based on the information of a concentration sensor 60. In addition, it can also be realized by controlling the amount of water returning to the mixing tank 45 using the water recovery pump 56 or the like.

An methanol-water solution which is diluted in the mixing tank 45 is pressurized by the fluid feed pump 46 and is then fed to the fuel electrode (negative electrode) 47 of the DMFC stack 42. At the fuel electrode 47, electrons are generated since an oxidation reaction of methanol proceeds. Hydrogen ions ($H^+$) generated by the oxidation reaction pass through the DMFC stack 42 and reach an air electrode (positive electrode) 52.

In addition, carbon dioxide generated by the oxidation reaction which proceeds at the fuel electrode 47 again returns to the mixing tank 45 together with an methanol-water solution which is not used for the reaction. After being vaporized in the mixing tank, the carbon dioxide flows toward the condenser 53 via the mixing tank valve 48 and is finally discharged outside from an exhaust port 58 via the exhaust valve 57.

On the other hand, after entering a suction port 49, air (oxygen) is pressurized by the air feed pump 50 and is then fed to the air electrode (positive electrode) 52 via the air feed valve 51. At the air electrode 52, a reduction reaction of oxygen proceeds, and by hydrogen ions ($H^+$) and oxygen ($O_2$), which are from the fuel electrode 47, and electrons ($e^-$) through an external load, water ($H_2O$) is generated in the form of water vapor. This water vapor is discharged from the air electrode 52 and then enters the condenser 53. In the condenser 53, the water vapor is cooled by the cooling fan 54 to form water (liquid) and is then temporarily stored in the water recovery tank 55. The water thus recovered is allowed to return to the mixing tank 45 by the water recovery pump 56.

As described above, the dilution circulation system 62 is formed.

As can be seen from the power generation mechanism of the fuel cell unit 10 by this dilution circulation system 62, in order to start the power generation by the DMFC stack 42, it is necessary to drive the auxiliary device 63 including the pumps 44, 46, 50, and 56, the valves 48, 51, and 57, or the cooling fan 54. By this drive, the methanol-water solution and air (oxygen) are fed inside the DMFC stack 42 so that an electrochemical reaction proceeds, thereby obtaining an electric power. On the other hand, in order to stop the power generation, the drive of the auxiliary device 63 including the above various constituent elements may be stopped.

Incidentally, the pumps 44, 46, 50, and 56 and the valves 48, 51, and 57 of the fuel cell unit 10 of the fuel cell unit 10 are disposed at a plurality of places inside the power generator 40 to form the dilution circulation system 62. Hence, it is particularly important to appropriately control operations of the constituent elements of the auxiliary device 63 in a well synchronous manner not only when the power generation is started and stopped but also, for example, when the load of the information processing apparatus 18 varies and an abnormal state occurs during the power generation. The constituent elements of the auxiliary device 63 are controlled by the controller 41 of the fuel cell unit 10.

The operation of the controller 41 of the fuel cell unit 10 will be described with reference to FIG. 6.

Figure 6:
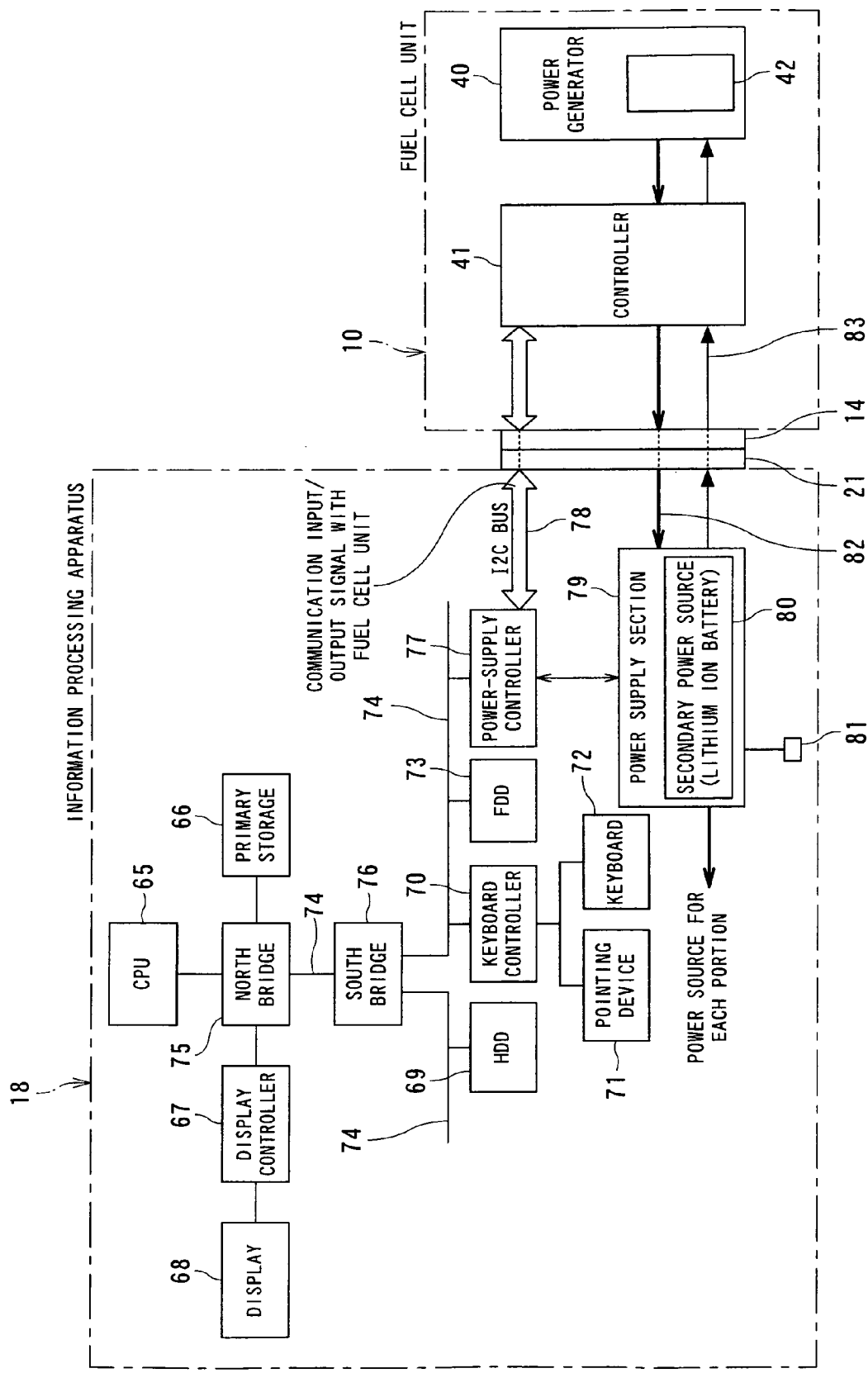
FIG. 6 is a schematic diagram showing one example of an information processing apparatus to be connected to the fuel cell unit.

FIG. 6 is a schematic diagram of the information processing apparatus 18 as one example of an information processing apparatus which can communicate with the controller 41 provided for the fuel cell unit 10 side of the present invention.

The information processing apparatus 18 is formed of devices such as a CPU 65, a primary storage 66, a display controller 67, a display 68, an HDD (hard disc drive) 69, a keyboard controller 70, a pointing device 71, a keyboard 72, a FDD (floppy (registered trade name) disc drive) 73, a bus 74 transmitting signals between the afore-mentioned constituent elements, a north bridge 75 and a south bridge 76, the above two bridges 75 and 76 being provided for converting signals transmitted via the bus 74. In addition, inside the information processing apparatus 18, a power supply section 79 is provided, and in this section, for example, a lithium ion battery is placed as a secondary battery 80. The power supply section 79 is controlled by a power-supply controller 77.

As electrical interfaces between the fuel cell unit 10 and the information processing apparatus 18, a control system interface and a power source system interface are provided.

The control system interface is an interface provided for communication between the power-supply controller 77 of the information processing apparatus 18 and the controller 41 of the fuel cell unit 10. The communication performed between the information processing apparatus 18 and the fuel cell unit 10 via the control system interface is performed via a serial bus such as an I2C bus 78. As described above, the power-supply controller 77 of the information processing apparatus 18 also functions as a controller communicating with the controller 41 of the fuel cell unit 10.

The power source system interface is an interface provided for supplying and receiving an electric power between the fuel cell unit 10 and the information processing apparatus 18. For example, an electric power generated by the DMFC stack 42 of the power generator 40 is supplied to the information processing apparatus 18 via the controller 41 and the docking connector 14 (power source supply line 82). In addition, the power source system interface also has an electric power supply line 83 from the power supply section 79 of the information processing apparatus 18 to the auxiliary device 63 and the like inside the fuel cell unit 10.

Depending on the configuration of the fuel cell unit 10, the number of the electric power supply lines 83 may vary in some cases.

In addition, an AC/DC converted direct current is supplied to the power supply section 79 of the information processing apparatus 18 via an AC adapter connector 81. By this configuration, the information processing apparatus 18 can be operated and the secondary battery (lithium ion battery) 80 can be charged.

Figure 7:
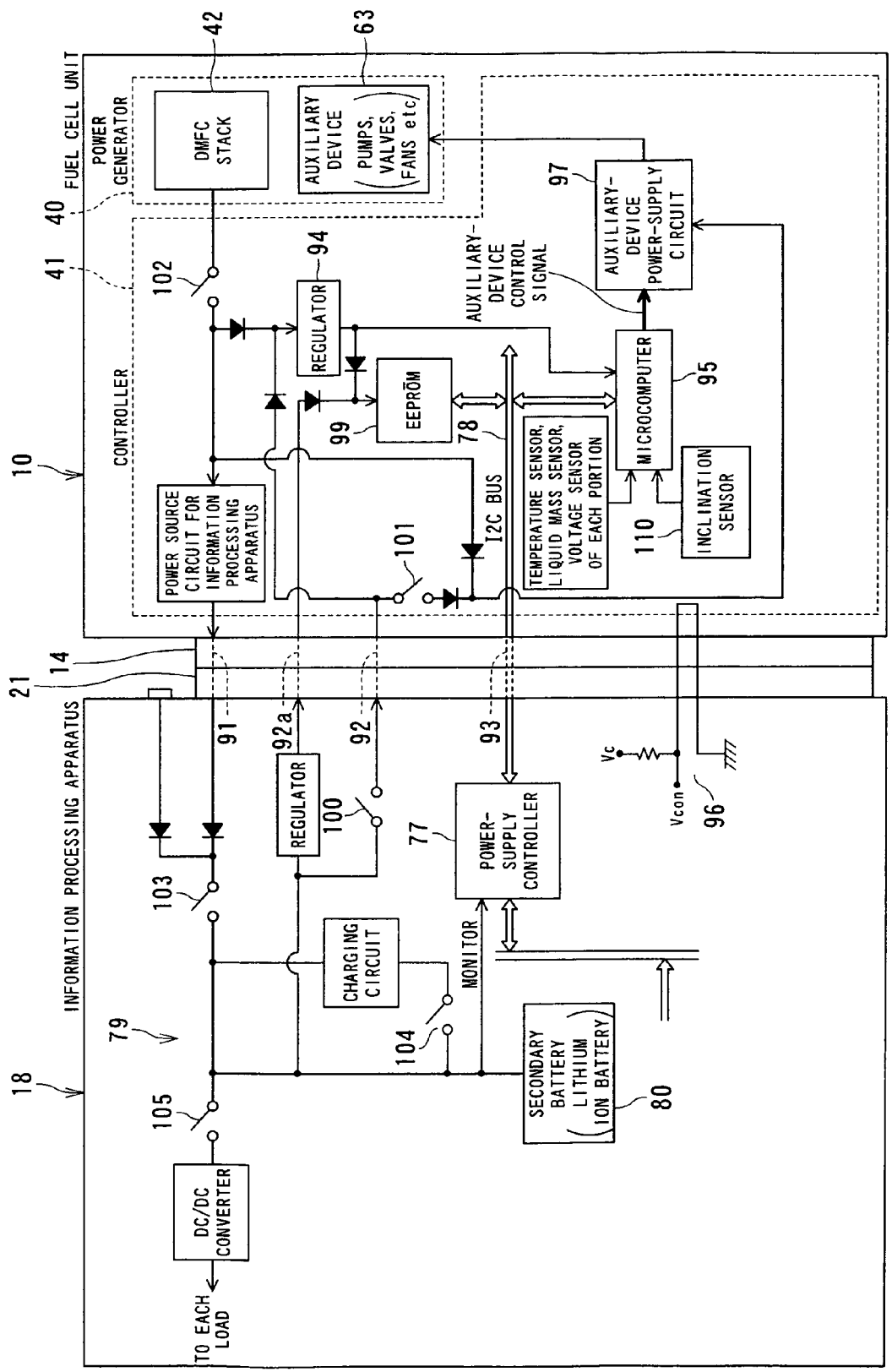
FIG. 7 is a schematic diagram showing a first embodiment of the fuel cell unit.

FIG. 7 is a schematic diagram showing an example of an electrical-function relationship between the controller 41 of the fuel cell unit 10 and the power supply section 79 of the information processing apparatus 18.

The fuel cell unit 10 and the information processing apparatus 18 are mechanically and electrically connected to each other with the docking connectors 14 and 21. The docking connectors 14 and 21 have a power source terminal 91 (fourth terminal) for supplying an electric power generated by the DMFC stack 42 of the fuel cell unit 10 to the information processing apparatus 18 and a power source terminal 92 (first terminal) for supplying a power source to a microcomputer 95 of the fuel cell unit 10 via a regulator 94 and a power source to an auxiliary-device power-supply circuit 97 via a switch 101 from the information processing apparatus 18. In addition, the docking connectors 14 and 21 also have a power source terminal 92a (third terminal) for supplying a power source from the information processing apparatus 18 to an EEPROM 99 (storage portion).

Furthermore, the docking connectors 14 and 21 have a communication output/input terminal 93 (second terminal) for communication of the power-supply controller 77 of the information processing apparatus 18 with the microcomputer 95 of the fuel cell unit 10 and preferably with the writable nonvolatile memory (EEPROM) 99.

Next, the process flow of an electric power generated by the DMFC stack 42 which is supplied to the information processing apparatus 18 from the fuel cell unit 10 is briefly described with reference to FIG. 7. In this case, it is assumed that a predetermined electric power is charged to the secondary battery (lithium ion battery) 80 of the information processing apparatus 18. In addition, it is also assumed that all the switches shown in the figure are opened.

First, the power-supply controller 77 of the information processing apparatus 18 recognizes that the fuel cell unit 10 is mechanically connected to the information processing apparatus 18 via the docking connectors 14 and 21. As a measure for recognition, for example, there may be mentioned monitoring of a voltage Vcon 96 of a connection recognition terminal provided for the docking connectors 14 and 21.

When the information processing apparatus 18 and the fuel cell unit 10 are mechanically connected to each other via the docking connectors 14 and 21, a power source is supplied from the information processing apparatus 18 side to the nonvolatile memory (EEPROM) 99 via the power source terminal 92a (third terminal). In this EEPROM 99, identification data or the like of the fuel cell unit 10 are stored beforehand. In the identification data, for example, information such as part codes, manufacturer's serial numbers, rated power and the like of the fuel cell unit 10 may be included beforehand. In addition, this EEPROM 99 is connected to a serial bus such as the I2C bus 78, and the data stored in the EEPROM 99 are readable when a power source is being supplied thereto. According to the configuration shown in FIG. 7, the power-supply controller 77 can read the information in the EEPROM 99 via the communication input/output terminal 93 (second terminal).

As described above, the power-supply controller 77 determines based on the information read from the EEPROM 99 whether an apparatus connected to the docking connector 21 is matched to the information processing apparatus 18 and is an adequate fuel cell unit 10. Based on the result of this determination, when the connected apparatus is mismatched or is an inadequate apparatus, for example, warning is shown on a display screen of the information processing apparatus 18 so as to call user's attention, and in addition, the sequence for power generation of the fuel cell unit 10 is stopped so as to avoid an accident in which a large amount of current is allowed to flow to the mismatched apparatus which is externally connected via the first power source terminal 92, so that the safety can be enhanced.

In particular, besides the external power source such as the fuel cell unit 10, a docker called a function expansion unit or a port replicator may be connected to the docking connector 21 of the information processing apparatus 18, and hence the measure to ensure the safety as described above is significantly important.

When the fuel cell unit 10 connected to the information processing apparatus 18 is determined matched thereto and is adequate based on the information stored in the EEPROM 99 by the power-supply controller 77, the sequence starting the power generation by the DMFC stack 42 is then allowed to proceed. In particular, a switch 100 of the information processing apparatus 18 is closed so that an electric power of the secondary battery 80 is supplied to the microcomputer 95 of the fuel cell unit via the power source terminal 92 (first terminal) of the docking connectors 14 and 21. By this supply, the microcomputer 95 of the fuel cell unit 10 can be operated.

In this stage, the power-supply controller 77 of the information processing apparatus 18 transmits a command indicating the start of power generation to the microcomputer 95.

The command indicating the start of power generation to be transmitted from the power-supply controller 77 to the microcomputer 95 can also use the serial bus (I2C bus) used for communication between the EEPROM 99 and the power-supply controller 77, and hence the configuration of the fuel cell unit 10 can be simplified, so that the cost can also be reduced.

The microcomputer 95 has a function of controlling the power generator 40 besides the function as the communication controller as described above.

Based on the command indicating the start of power generation from the power-supply controller 77, the microcomputer 95 transmits an auxiliary device-control signal to the auxiliary-device power-supply circuit 97 for starting the drive of an auxiliary device 63 including the pumps, valves, and fans which are necessary to start the power generation. In addition, the microcomputer 95 closes the switch 101 so as to supply an electric power to the auxiliary-device power-supply circuit 97 from the information processing apparatus 18.

As described above, the auxiliary device 63 of the power generator 40 of the fuel cell unit 10 starts its operation, and methanol and air are fed to the DMFC stack 42, so that the DMFC stack 42 starts the power generation. In addition, the microcomputer 95 closes a switch 102 so as to supply a generated electric power to the information processing apparatus 18 via the power source terminal 91 (fourth terminal) provided for the docking connector. Furthermore, the power-supply controller 77 of the information processing apparatus 18 closes switches 103 and 105, and an electric power is supplied to a load inside the information processing apparatus 18.

When the information processing apparatus 18 is a notebook personal computer by way of example, depending on the content of an application program and the operation of peripheral components such as a HDD, the electric power consumption of the apparatus considerably varies. A switch 104 of the information processing apparatus 18 is closed, for example, when the electric power consumption is small, so that the secondary battery can be charged by an electric power from the fuel cell unit 10.

In the embodiment shown in FIG. 7, it is assumed that the identification-information of the fuel cell unit 10 to be connected to the information processing apparatus 18 is stored beforehand in the nonvolatile memory (EEPROM) 99. However, a measure to obtain the identification information is not limited to the above, and when the information processing apparatus 18 can obtain some identification information of the fuel cell unit 10 via the communication input/output terminal 93 (second terminal), the nonvolatile memory (EEPROM) 99 may be replaced therewith.

In the configuration of the fuel cell unit 10 shown in FIG. 7, between the power-supply controller 77 of the information processing apparatus 18 and the microcomputer 95 of the fuel cell unit 10, communication can be performed via a serial bus such as the I2C bus 78. The command indicating the start of power generation is transmitted from the information processing apparatus 18 via this serial bus as described above; however, of course, the type of command is not limited to the command indicating the start of power generation, and various commands may be transmitted. Hereinafter, particular examples of the commands and the operation of the fuel cell unit based on the command will be briefly described.

First of all, as a command from the information processing apparatus 18, a small remaining amount (low battery) command of the secondary battery (lithium ion battery) 80 of the information processing apparatus 18 may be mentioned. The small remaining amount (low battery) indicates the state in which the remaining amount of the secondary battery 80 becomes a predetermined value or less and which may be considered as one abnormal state of the secondary battery 80 of the information processing apparatus 18. This low battery state is detected and determined by monitoring the secondary battery 80 by the power-supply controller 77. When the secondary battery 80 is determined in the small remaining amount (low battery) state, in order to avoid abnormal termination of application programs, loss of data and the like caused by abrupt power source shutoff at the information processing apparatus 18 side, after a data saving measure is taken, for example, a measure to start the sequence for forced termination of the application programs may be performed in some cases.

Also in the case in which the fuel cell unit 10 is connected to an information processing apparatus, the abrupt power source shutoff causes serious damage to the fuel cell unit. In the state in which the fuel cell unit 10 generates an electric power under steady state condition, an electric power generated by the fuel cell unit 10 is supplied as an electric power for the auxiliary device 63 including the pumps and valves; however, at the initial stage of the operation, the supply of an electric power is performed from the secondary battery 80 of the information processing apparatus 18. When the auxiliary device 63 receives an electric power, and the sequence for starting the operation is started, of the constituent elements of the auxiliary device 63, for example, the air feed valve 51 for taking air from the outside, the exhaust valve 57 discharging gas to the outside, or the mixing tank valve 48 discharging impurities such as carbon dioxide are opened.

While the valves 48, 51, and 57 are being opened as described above, when the secondary battery 80 of the information processing apparatus 18 is stopped, the valves mentioned above are left open. Accordingly, impurities are allows to enter from the outside, and as a result, the reliability of the fuel cell unit 10 is degraded. As a measure to avoid the situation described above, before the output of the secondary battery 80 of the information processing apparatus 18 is totally stopped, a measure is effectively performed in which after the small remaining amount (low battery) state of the secondary battery is detected and determined, this state is transmitted to the fuel cell unit 10 as a low remaining amount (low battery) command indicating the start of an auxiliary device-stopping sequence to close the valves 48, 51 and 57.

In addition, as a second advantageous and effective command when it is included in the commands, there may be mentioned a calibration command to an inclination sensor 110 of the fuel cell unit 10. In the fuel cell unit 10 using the above dilution circulation system 62, for example, since the water recovery tank 55 described above is provided, the fuel cell unit 10 must be held horizontally within a predetermined allowable range, and hence the inclination sensor 110 may be provided inside the fuel cell unit 10 in some cases. For the inclination sensor 110, calibration is generally performed in order to correct the installation error. After the fuel cell unit 10 is disposed beforehand in a horizontal-position, when a calibration command can be transmitted to the microcomputer 95 of the fuel cell unit 10 from the information processing apparatus 18 side while the fuel cell unit 10 is being disposed as described above, the value of the inclination sensor 110 in the horizontal state can be obtained as a standard value. As described above, when the calibration command is included in the commands to the fuel cell unit 10 from the information processing apparatus 18, the calibration of the inclination sensor 110 can be easily performed.

Figure 8:
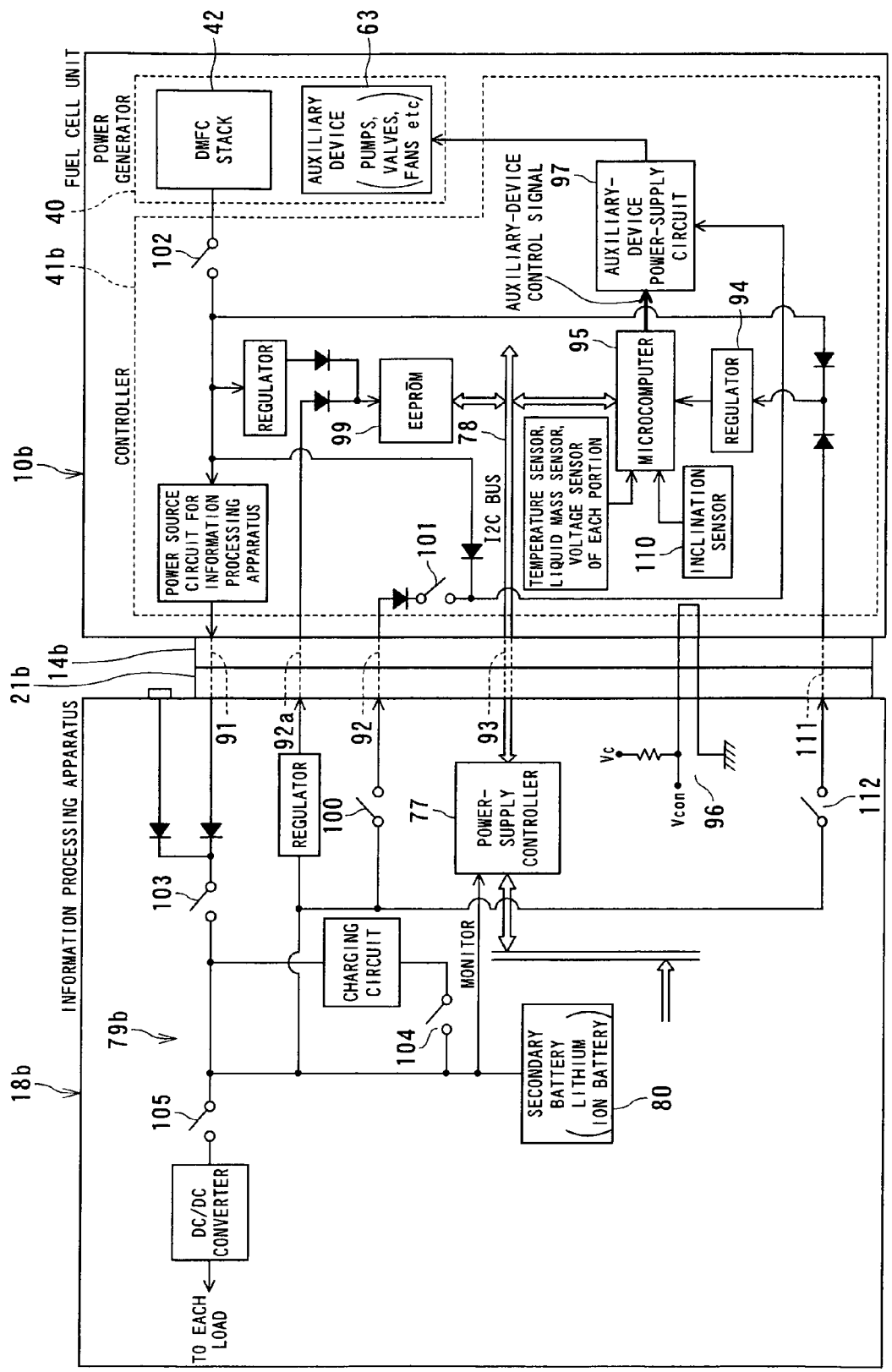
FIG. 8 is a schematic diagram showing a second embodiment of a fuel cell unit according to the present invention.

FIG. 8 is a view showing a second embodiment of the fuel cell unit 10 according to the present invention. Since the major portion of the second embodiment is common to that of the first embodiment, the same reference numerals of the elements of the first embodiment designate the elements of the second embodiment which are common thereto, and different portions will only be described.

In the second embodiment shown in FIG. 8, the supply of a power source to the microcomputer 95 of a fuel cell unit 10b is separated from the power source to the auxiliary-device power-supply circuit 97, and a power source terminal (fifth terminal) 111 is further provided in a docking connector 14b so that a power source can be supplied from an information processing apparatus 18b via this power source terminal (fifth terminal) 111.

In particular, in the information processing apparatus 18b, the output of the secondary battery 80 is further divided, so that a power source is supplied to the microcomputer 95 via a switch 112 and the power source terminal (fifth terminal) 111 provided in the docking connector 14b. According to the configuration described above, in the sequence of connection and power-generation start of the fuel cell unit 10b, the safety can be further enhanced as compared to that in the first embodiment.

That is, in the first embodiment, the configuration is formed in which an electric power is supplied to the auxiliary-device power-supply circuit 97 and the microcomputer 95 via the common power source terminal 92 (first terminal). Before a power source is supplied to the outside via the power source terminal 92 (first terminal), the identification information of the fuel cell unit 10 is read from the nonvolatile memory (EEPROM) 99, and it is determined whether the supply via the power source terminal 92 (first terminal) is performed or not. On the other hand, in the second embodiment, a power source can be supplied to the microcomputer via the power source terminal (fifth terminal) 111. Hence, before an electric power is supplied outside via the power source terminal 92 (first terminal), detailed identification information can be obtained from the microcomputer 95 in addition to the above nonvolatile memory (EEPROM) 99. Furthermore, the state inside the fuel cell unit 10b (no abnormality present in each portion) can be monitored just before supplying an electric power to the auxiliary-device power-supply circuit 97 by closing the switches 100 and 101 of the fuel cell unit 10b, and hence the fuel cell unit 10b having more safety can be provided.

The present invention is not limited to the above embodiments, and the constituent elements may be variously modified in the implementation phase without departing from the sprit and the scope of the present invention. In addition, when the various constituent elements disclosed in the above embodiments are optionally used in combination, various aspects of the invention may be formed. For example, some of all the constituent elements described in the above embodiments may be eliminated in some cases. Furthermore, the constituent elements of the different embodiments may be optionally used in combination.

What is claimed is:

1. A fuel cell unit connectable to an external apparatus, comprising:
    a fuel cell configured to generate electric power;
    an auxiliary device configured to feed fuel and air to the fuel cell;
    a storage portion configured to store identification data identifying the fuel cell unit, the identification data being read by the external apparatus to determine whether the fuel cell unit matches the external apparatus based on the identification data;
    a controller configured to start a sequence of power generation by the fuel cell; and
    a sensor measuring the posture of the fuel cell unit, wherein the controller receives electric power supplied from the external apparatus when the fuel cell unit is determined to match the external apparatus, and the controller supplies the electric power received from the external apparatus to the auxiliary device to start the sequence of power generation, and wherein when the controller receives a command which is transmitted from the external apparatus and which indicates execution of calibration of the sensor, the controller executes the calibration of the sensor.

2. The fuel cell unit according to claim 1, wherein, after the controller supplies electric power received from the external apparatus to the auxiliary device, the controller controls the auxiliary device, whereby electric power generated by the fuel cell is supplied to the external apparatus.

3. The fuel cell unit according to claim 1, wherein when a power source of the external apparatus is in an abnormal state, the controller receives a command which is transmitted from the external apparatus and which indicates the abnormal state of the power source of the external apparatus, and the controller stops the control of the auxiliary device.

4. A method for controlling a fuel cell unit which is connectable to an external apparatus and which includes a fuel cell generating electric power, an auxiliary device feeding fuel and air to the fuel cell, a sensor measuring the posture of the fuel cell unit, and a controller controlling power generation by the fuel cell, the method comprising:

storing identification data for identifying the fuel cell unit, the identification data being read by the external apparatus to determine whether the fuel cell unit matches the external apparatus based on the identification data; and starting, by the controller, a sequence of power generation by the fuel cell, wherein the controller receives electric power supplied from the external apparatus when the fuel cell unit is determined to match the external apparatus, and the controller supplies the electric power received from the external apparatus to the auxiliary device to start the sequence of power generation, and wherein when the controller receives a command which is transmitted from the external apparatus and which indicates execution of calibration of the sensor, the controller executes the calibration of the sensor.

5. The method for controlling a fuel cell unit, according to claim 4, wherein after the controller supplies electric power received from the external apparatus to the auxiliary device, the controller controls the auxiliary device, whereby electric power generated by the fuel cell is supplied to the external apparatus.

* * * * *